(12) United States Patent
Mangin et al.

(10) Patent No.: US 6,704,280 B1
(45) Date of Patent: Mar. 9, 2004

(54) SWITCHING DEVICE AND METHOD FOR TRAFFIC POLICING OVER A NETWORK

(75) Inventors: James L. Mangin, San Ramon, CA (US); Mohan V. Kalkunte, Sunnyvale, CA (US); Sanjay Munshi, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/330,238

(22) Filed: Jun. 10, 1999

(51) Int. Cl.[7] .............................................. H04L 12/26
(52) U.S. Cl. ...................................... 370/230; 370/232
(58) Field of Search ................................ 370/229–235, 370/395.2, 395.21, 468

(56) References Cited

U.S. PATENT DOCUMENTS

| | | |
|---|---|---|
| 5,666,353 A | 9/1997 | Klausmeier et al. |
| 5,898,673 A | 4/1999 | Riggan et al. |
| 5,905,870 A | 5/1999 | Mangin et al. |
| 6,018,517 A | 1/2000 | Bengio et al. |
| 6,072,989 A | 6/2000 | Witters et al. |
| 2002/0004379 A1 * | 1/2002 | Gruhl et al. ................. 455/403 |
| 2002/0133589 A1 * | 9/2002 | Gubbi et al. ................. 709/225 |

FOREIGN PATENT DOCUMENTS

WO    WO 98 37730 A    8/1998

OTHER PUBLICATIONS

Varadarajan, S., et al.: "EtheReal: a host–transparent real-time Fast Ethernet switch" Proceedings Sixth International Conference on Network Protocols )Cat. No. 98TB100256), Austin, TX, Oct. 13–16, 1998, pp. 12–21, XP002160322; 1998, Los Alamitos, CA, IEEE Comput. Soc. ISBN: 0–8186–8988–9.

MacLeod, B.: "Gigabit Ethernet Full–Duplex Repeaters"; Annual Review of Communications, 1997, XP000720916, p. 505.

Engel, R., et al: "Exploring the Performance Impact of QOS Support in TCP/IP Protocol Stacks" Proceedings IEEE Infocom; The Conference on Computer Communications, New York, NY; IEEE, Mar. 29, 1998, pp. 883–892; XP000852074; ISBN: 0–7803–4384–0.

* cited by examiner

*Primary Examiner*—Melvin Marcelo
(74) *Attorney, Agent, or Firm*—Blakely Sokoloff Taylor & Zafman LLP

(57) ABSTRACT

A flow of information over a network is controlled by a policing function placed at a data link layer of the network. For a full-duplex architecture, an accumulated count value for each packet of information received as input by a switching device is ascertained during a predetermined interval. The policing function at a data link layer determines if the accumulated count value has exceeded an interval bit rate based on a transmission rate set by a traffic contract at a networking layer higher than the data link layer. In response to the accumulated count value exceeding the interval bit rate, the switching device sends a PAUSE frame to halt transmission of the information. The half-duplex architecture, collision based backpressure and carrier-sense backpressure techniques are used by the policing function for enforcement of the traffic contracts.

22 Claims, 8 Drawing Sheets

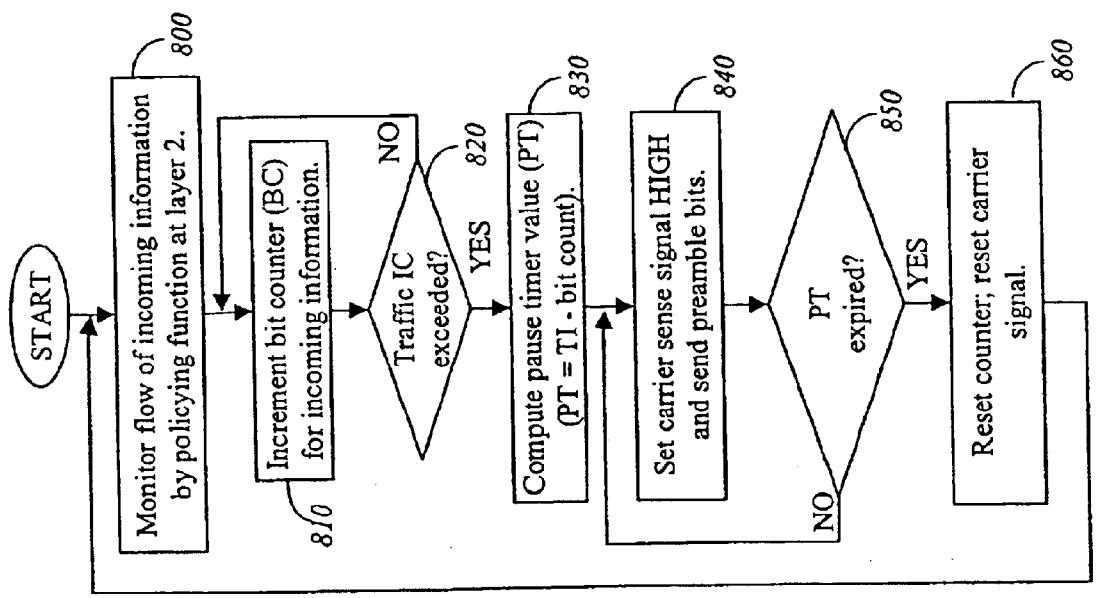

SWITCHING DEVICE AND METHOD FOR TRAFFIC POLICING OVER A NETWORK

BACKGROUND

1. Field

The invention relates to the field of communications. More specifically, the invention relates to a switching device and method for policing the flow of information over a network.

2. General Background

Computer networks provide a mechanism for transferring information between various locations. One type of computer network, referred to as an Ethernet, is a packet-based local area network (LAN) using Carrier Sense Multiple Access with Collision Detect (CSMA/CD) access protocol. Typically, Ethernet is configured in accordance with Open System Interconnection (OSI) and the Institute of Electrical and Electronic Engineers (IEEE) 802.3 standard.

As shown in FIG. 1, an embodiment of the seven-layer OSI reference model 100 for a conventional Switched Ethernet is shown. Switched Ethernet comprises a physical layer 110, a data link layer 120, a network layer 130, a transport layer 140, a session layer 150, a presentation layer 160 and an application layer 170. More specifically, physical layer 110 is concerned with the transmission of bits across a medium (e.g., twisted pair, coaxial, optical fiber, etc.) while data link layer 120 is concerned with the point-to-point connection between two devices (e.g., switches, computers, etc.). As shown, data link layer 120 is separated into two sublayers, one of which is a media access control (MAC) sublayer 121. MAC sublayer 121 not only arbitrates for access to the medium using its unique MAC address, but also produces data frames for subsequent transmission as a stream of bits over the medium.

Referring still to FIG. 1, network layer 130 is concerned with the transmission of data across multiple links or multiple networks connected by switches. For conventional Switched Ethernet, a policing function 180 is employed within network layer 130 or a higher level layer (e.g., transport). Policing function 180 enforces "traffic contracts" established by differentiated services for example (described below).

As set forth in an Internet Draft of the Internet Engineering Task Force (IETF) entitled "Differentiated Services" published on or around February 1999, differentiated services provides an architecture from which Internet Service Providers (ISPs) can offer a range of network services at different pricing to each customer. More specifically, a customer selects a particular level of service at a predetermined price. Upon selecting a service level, the customer has entered into a traffic contract with the ISP. The "traffic contract" involves the ISP agreeing to support a particular transmission bit rate associated with the chosen service level (referred to as the "negotiated bit rate") in exchange for monetary compensation. Residing in network layer (OSI layer 3) 130 for example, policing function 180 attempts to enforce the traffic contract. However, the latency realized in routing data from physical and data link layers 110 and 120 to network layer 130 prevents strict enforcement of the traffic contract.

As shown in FIG. 2, an illustrative embodiment of a conventional Switched Ethernet 200 is shown. Switched Ethernet 200 comprises a switch 210 that includes a finite amount of buffer memory 215. In this embodiment, switch 210 operates as a multiport device having N addressable ports $220_1$–$220_N$ ("N" is a positive whole number). A plurality of computers 230 are coupled to a portion of addressable ports $220_1$–$220_N$ via a plurality of links 240. This supports simultaneous, half or full-duplex transmissions of frames between computers 230 and addressable ports $220_1$–$220_N$ of switch 210. A "frame" includes one or more packets of data, address and/or control information arranged in a predetermined format. In addition, switch 210 is coupled to a link 250.

It has been appreciated that Switched Ethernet may be implemented with different varieties of links. For example, link 250 may be a 100BASE-T link that offers a faster transmission rate than links 240 (e.g., 10BASE-T links). In certain situations, where switching device 210 is not able to handle burst transmissions from devices coupled to link 250, network performance may worsen. Of course, this performance degradation could be reduced by adding substantial buffer memory to switch 210 at a substantial increased cost.

Recently, in accordance with IEEE 802.3x, additional features have been added to handle the above-described performance issues for full-duplex Switched Ethernet. For example, once buffer memory 215 is full, switch 210 is capable of throttling the transmission of incoming frames from a computer (e.g., computer $230_1$) by sending a particular type of Media Access Control (MAC) control frame 260 back to computer $230_1$. This type of MAC control frame 260 is referred to as a PAUSE frame. Once computer $230_1$ decodes and recognizes incoming information as a PAUSE frame, computer $230_1$ pauses the transmission of frames for the specified time period. Once the time period has expired, computer $230_1$ continues to transmit frames. However, a PAUSE frame 260 is used solely and exclusively to handle overflow conditions of buffer memory 215.

Hence, it would be desirable to develop a switching device and method to utilize data link layer functionality for enforcement of traffic contracts.

SUMMARY

The present invention relates to a switching device and method for policing a flow of information over a network. The policing function is situated at the data link layer and capable of receiving a transmission rate from a traffic contract at a higher level. The close proximity of the policing function to the physical medium enables stricter enforcement of traffic contracts.

For full-duplex communications, the policing function uses a PAUSE frame to throttle input. A PAUSE frame is issued when an accumulated count value has exceeded an interval bit rate based on the transmission rate set by a traffic contract. Multiple PAUSE frames may be used to halt transmissions beyond the maximum delay time provided by a single PAUSE frame. For half-duplex communications, the policing function relies on collision-based backpressure and carrier sense backpressure techniques.

Other aspects and features of the invention will become apparent to those of ordinary skill in that the art upon review of the following description of specific embodiments of the invention in conjunction with the accompanying figures.

BRIEF DESCRIPTION OF THE DRAWINGS

The features and advantages of the present invention will become apparent from the following detailed description of the present invention in which:

FIG. 8 is an illustrative flowchart of a second technique for flow control associated with a switched, half-duplex Ethernet using carrier sense backpressure.

DETAILED DESCRIPTION OF AN EMBODIMENT

Embodiments of the present invention relate to a switching device and method for policing the flow of information (traffic) over a Switched Ethernet. Herein, in one embodiment, traffic policing functionality is mapped from a network layer to a data link layer. This reduces software overhead required for the enforcement of traffic contracts and ensures that switching devices are capable of complying even with the most strict traffic contracts.

Herein, certain terminology is used to describe various features of the present invention. In general, a "switching device" comprises either an edge switch or a core switch. An "edge switch" is a multiport device directly coupled to one or more edge devices. Each port of the edge switch operates as a separate local area network with its own broadcast domain. An "edge device" is a source and/or destination for networked data. Examples of an "edge device" include but are not limited or restricted to a personal computer, file server, mainframe, printer and the like. A "core switch" is a multiport device for routing information from an edge switch to either another core switch or an edge switch employed in a Switched Ethernet. Examples of a "core switch" include a router, a bridge and the like.

"Information" generally comprises one or more signals representative of one or more bits of data, address, control or any combination thereof. Information is transmitted in accordance with any chosen packeting scheme or frame format. A "link" includes medium for connecting edge devices, switching devices and the like. These links supports the transmission or reception of information over a selected medium such as, for example twisted pair, coaxial cable, optical fiber, wireless or any combination thereof.

Figure 1:
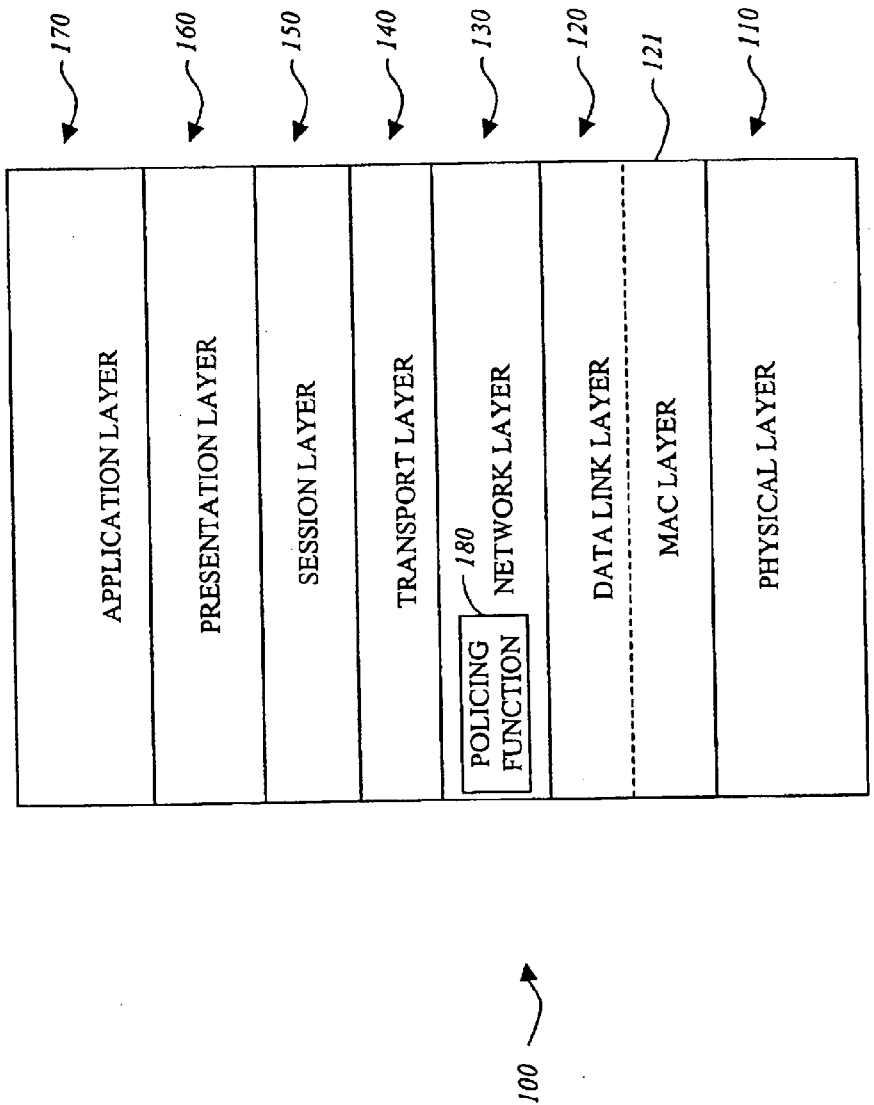
FIG. 1 is an illustrative embodiment of the seven-layer OSI reference model for a Switched Ethernet.
Figure 2:
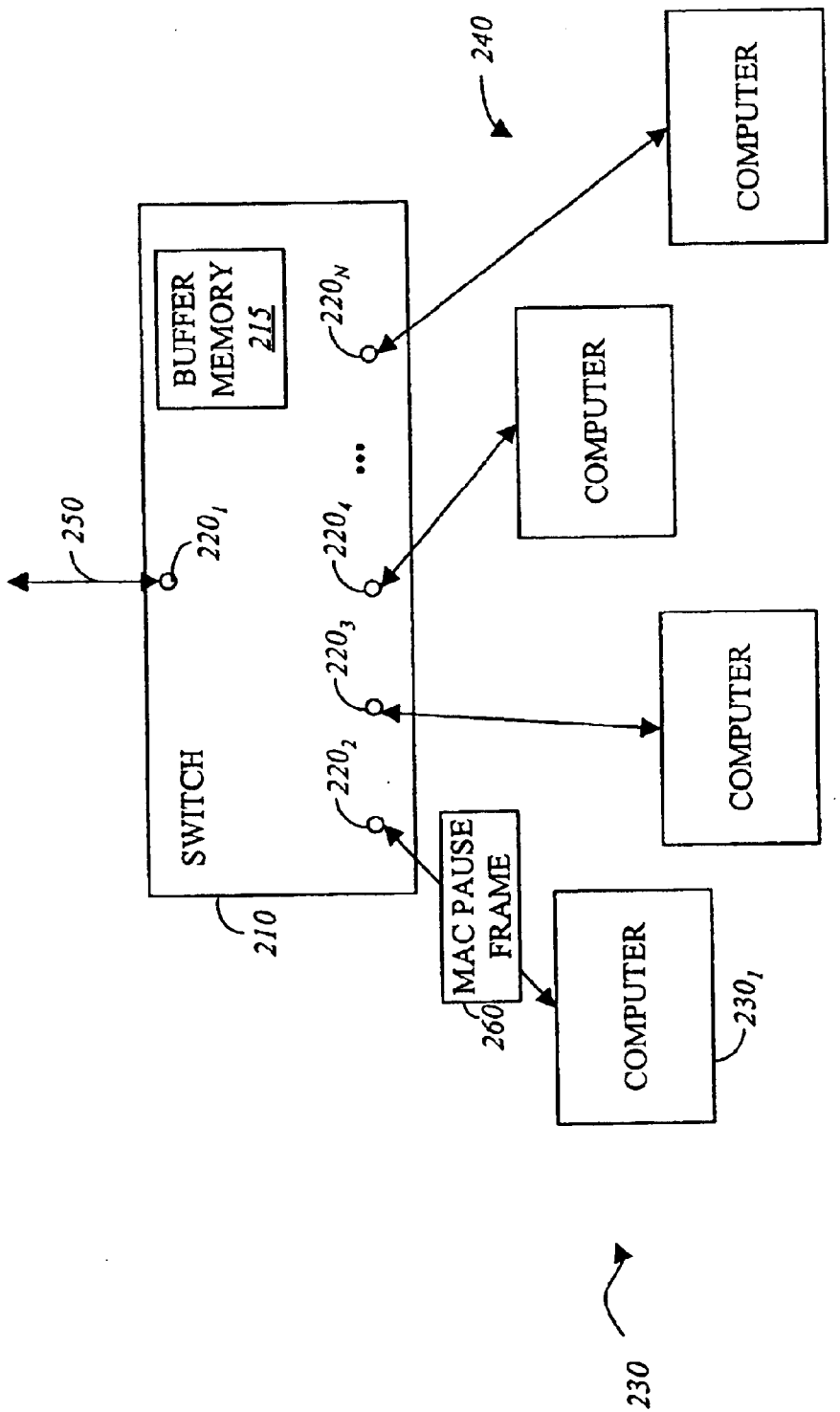
FIG. 2 is an illustrative embodiment of a conventional Switched Ethernet supporting full-duplex transmissions.
Figure 3:
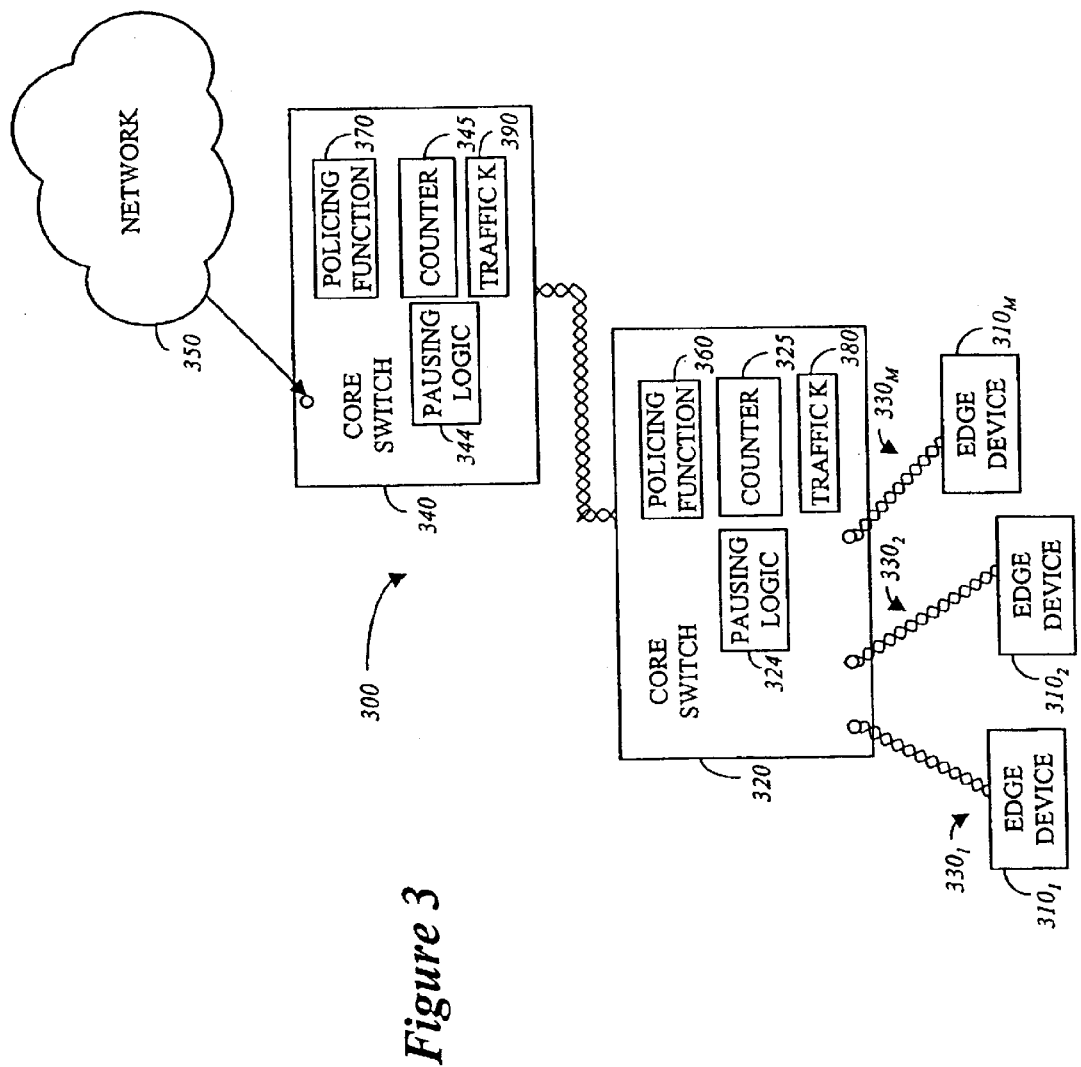
FIG. 3 is an illustrative embodiment of a Switched Ethernet using PAUSE frames for flow control.

Referring to FIG. 3, an illustrative embodiment of a Switched Ethernet 300 using PAUSE frames for flow control to enforce traffic contracts is shown. Switched Ethernet 300 comprises edge devices $310_1$–$310_M$ ("M" is a positive whole number) physically coupled to an edge switch 320 via links $330_1$–$330_M$. As shown, links $330_1$–$330_M$ are full-duplex twisted wire cables such has 10BASE-T or 100BASE-T type cable for example. It is contemplated, however, that links $330_1$–$330_M$ may be half-duplex, coaxial cables (e.g., 10BASE-2 or 10BASE-5 type cabling) or even optical fiber. Edge switch 320 is coupled to a core switch 340, which interconnects edge devices $310_1$–$310_M$ with a network 350 accessible by other edge devices. Each edge and core switch 320 and 340 includes processing logic 324 and 344 and a counter 325 and 345, respectively. In this embodiment, counters 325 and 345 are incremental bit counters (e.g., 16-bit counters) that monitor the number of incoming bits in increments of slot times. A "slot time" is equal to the round trip propagation delay of the Switched Ethernet, generally defined as 512 bit times. Of course, counters 325 and 345 may be configured to monitor any amount of input data (e.g., bytes, works, packets, etc.)

As shown, both edge switch 320 and core switch 340 are implemented with respective policing functions 360 and 370 residing at their data link layers. Traffic contracts (Traffic K) 380 and 390 are established and negotiated by a management agent at any layer and then translated down to policing functions 360 and 370, respectively. Hence, the policing function is capable of determining the duration of an interval to police at a given rate.

A. Policing for Full-Duplex Switched Ethernet

Figure 4:
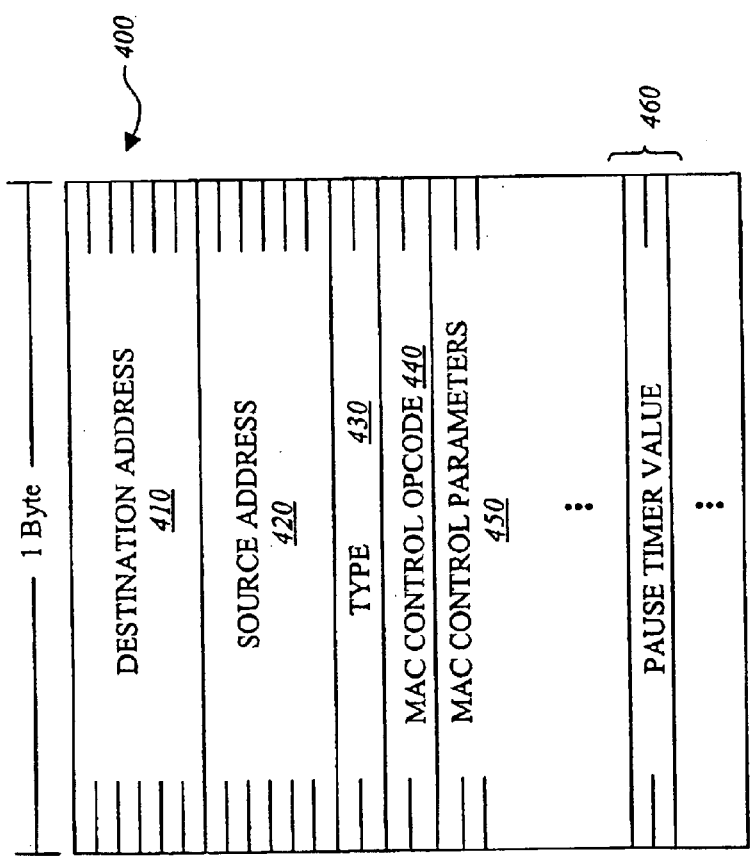
FIG. 4 is a block diagram of an illustrative embodiment of the PAUSE frame.

Referring now to FIG. 4, a block diagram of an illustrative embodiment of the format of a PAUSE frame 400 is shown. PAUSE frame 400 represents a standard MAC control frame but features a specific encoding sequence. As shown, PAUSE frame 400 includes a destination address 410, a source address 420, a type/length 430, a MAC control opcode 440, and MAC control parameters 450. Herein, type/length 430 and MAC control opcode 440 are 2-byte fields that are assigned a globally recognized values of "8808" and "0001" hexidecimal (H), respectively.

In this embodiment, destination address 410 is a 48-bit field capable of containing an address of device(s) to which PAUSE frame 400 is addressed. For PAUSE frame 400, destination address 410 is loaded with a specific, globally assigned value (01-80-C2-00-00-01H) for use as its multi-cast address. It is contemplated, however, is that destination address 410 may be a unicast address targeting a specific edge or switching device. Similarly, source address 420 is a 48-bit field configured to contain an address of the originator of the transmitted information.

For PAUSE frame 400, MAC control parameters 450 contains a pause timer value 460. Represented as two-bytes for illustrative purposes, pause timer value 460 represents a number of slot times to stall transmission. Thus, in this embodiment, a maximum delay of 65,536 ($2^{16}$) slot times is possible for each PAUSE frame 400. This translates into a delay of 3,355 microseconds ($\mu$s) for a 10 Megabit per second (Mbps) link, 335.5 $\mu$s for a 100 Mbps link and 33.5 $\mu$s for a 1 Gigabit per second (Gbps) link.

Figure 5:
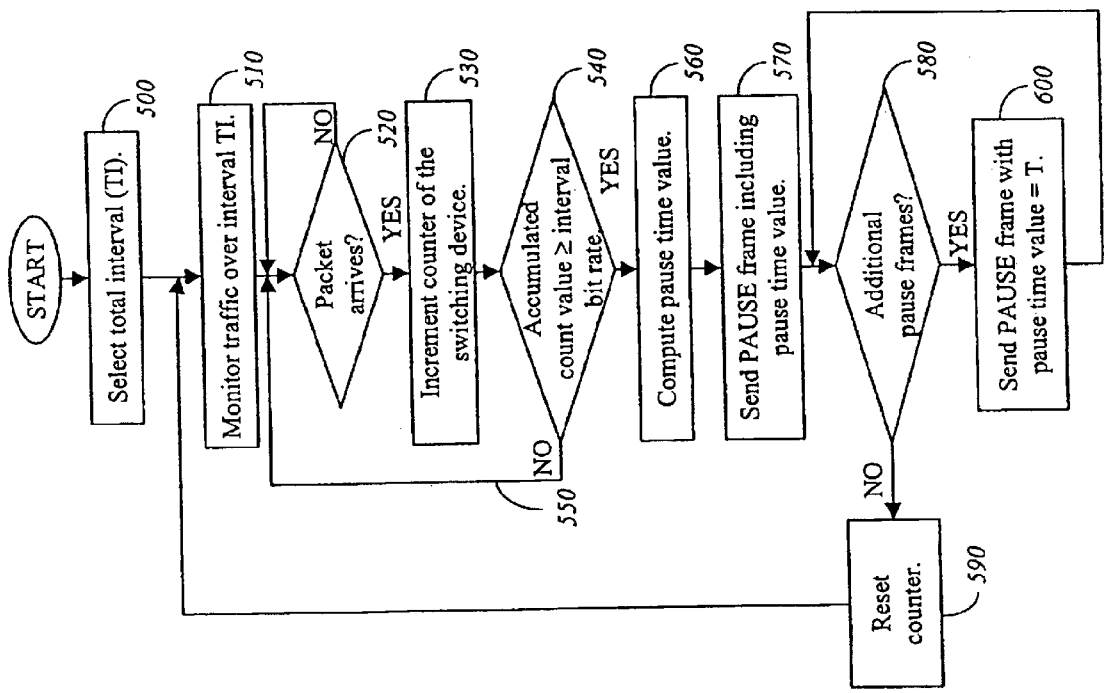
FIG. 5 is a flowchart of an illustrative embodiment of operations performed by a switching device in utilizing a PAUSE frame as flow control to enforce the negotiated rate set forth in a traffic contract.

Referring now to FIG. 5, an illustrative flowchart of a switching device utilizing a PAUSE frame as flow control to enforce the negotiated rate set forth in a traffic contract is shown. Initially, a suitable total interval (TI) is selected for the policing function to monitor the flow of traffic (block 500). In this embodiment, TI is a selected number "r" of slot time intervals (T), where "T" can range from 1 to 65,536 slot times as shown in equation (1):

$$TI = r*T, \text{ where "r" depends on the duration of selected interval } TI. \qquad (1)$$

Once the total interval (TI) is selected, traffic is monitored over that interval (block 510). One monitoring scheme involves the conversion of the negotiated bit rate set forth by the traffic contract into a bit rate over the selected total interval. For example, if TI is equal to one millisecond and the negotiated bit rate is 2 Mbps, the interval bit rate is 2 kilobits per millisecond.

As packets arrive (block 520), the counter is incremented accordingly (block 530). At the end of each packet, the accumulated count value (e.g., a bit count) is compared against the value of the interval bit rate (block 540). If this accumulated bit count is less than the interval bit rate and the interval has not elapsed, the bit counter waits for another packet (block 550). However, if the accumulated bit count exceeds the interval bit rate, the switching device transmits a PAUSE frame to the source of its incoming packets of information. The PAUSE frame includes a pause timer value (PT) that is equal to a difference between a slot time interval (T) and the accumulated bit count (blocks 560 and 570). Of course, it is not necessary to wait for the arrival of the entire frame before sending the PAUSE frame if the traffic contract is exceeded during arrival of packets associated with the frame. The reason is that receipt of a PAUSE frame by the source of the packets will not halt data transmission immediately. Rather, the source would wait until the end of its current packet transmission before ceasing transmissions for the time specified in the PAUSE frame.

Thereafter, a determination is made whether additional PAUSE frames need to be transmitted to the source (block 580). Where the slot time interval (T) associated with the prior PAUSE frame is the last slot time of an interval, no additional PAUSE frames are required. Hence, the counter is reset and the monitoring scheme is repeated (block 590). However, if there exists additional slot times before the total interval (TI) has elapsed, PAUSE frames are transmitted at the start of each slot time interval (T) as shown in block 600. PT for each additional PAUSE frame will be equal to T time units.

Figure 6:
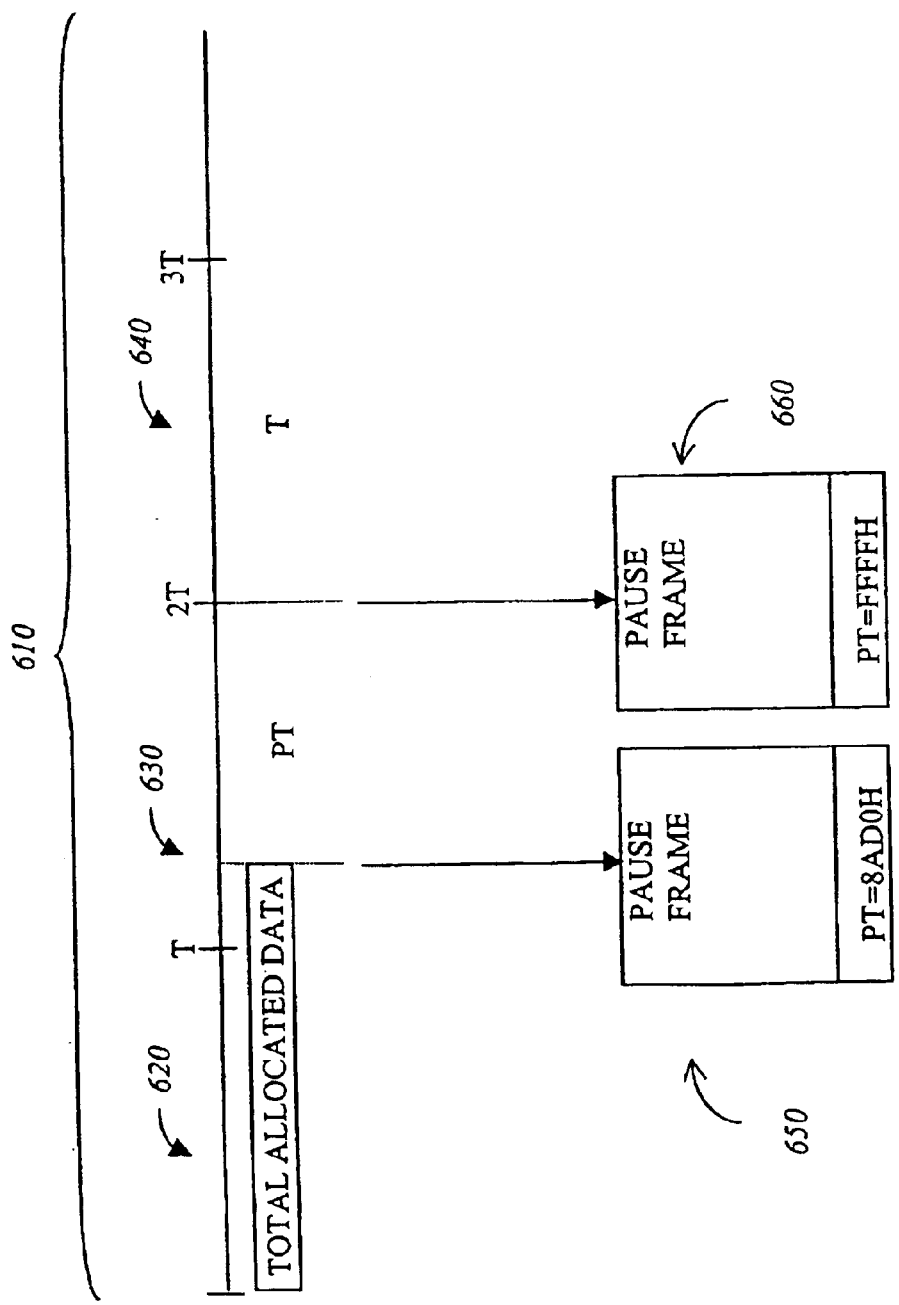
FIG. 6 is a flowchart of an exemplary example of the flow control operations of a policing function employed in a data link layer of a switching device of a full-duplex 100BASE-T Switched Ethernet.

Referring now to FIG. 6, an exemplary example of the flow control operations of a policing function employed in a data link layer of a switching device of a full-duplex 100BASE-T Switched Ethernet is shown. The total interval (TI) 610 is equal to three (r=3) slot time intervals (T), each slot time interval 620, 630 and 640 is equal to a maximum 65,536 slot times. Thus, TI 610 is approximately 1 millisecond in duration. In the event that the traffic contract is exceeded after 30,000 slot time units during second slot time interval 630, a PAUSE frame 650 is sent from the switching device. The pause time value loaded in PAUSE frame 650 is equal 35,536 or "8AD0" hexidecimal. Since the traffic contract has been exceeded even before slot time interval 640, an additional PAUSE frame 660 is sent with a pause time value of "FFFF" hexadecimal to halt transmission during third slot time interval 640. Thereafter, information transmissions will resume.

B. Policing for Half-Duplex Switched Ethernet

Figure 7:
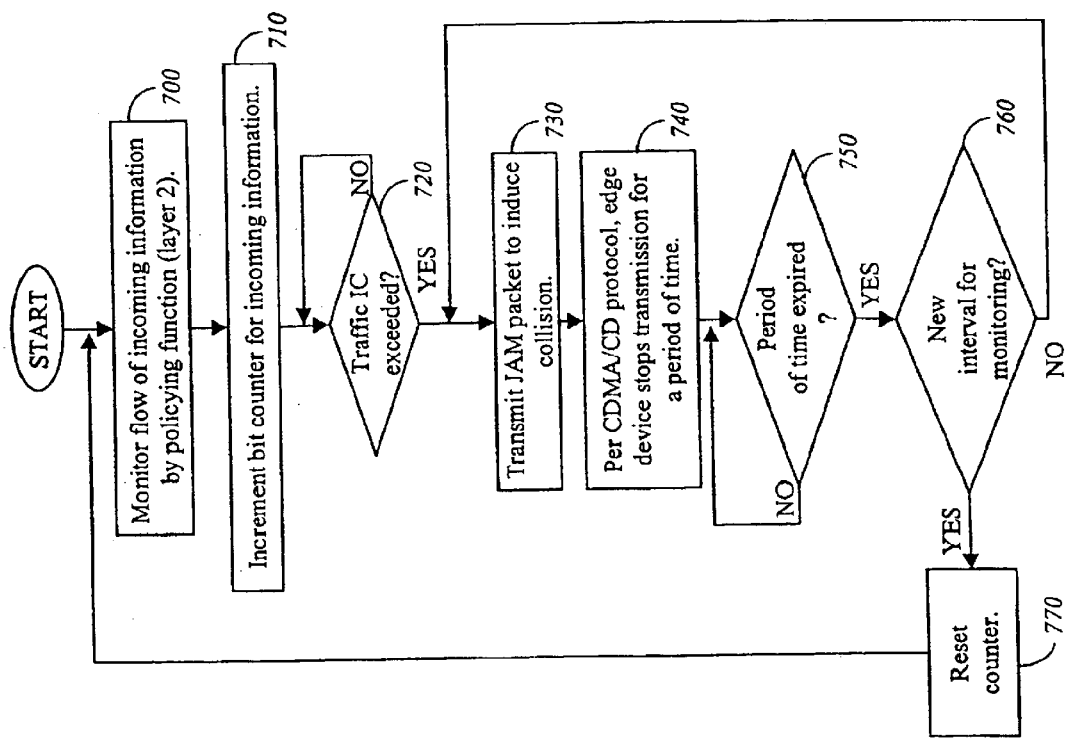
FIG. 7 is an illustrative flowchart of a first technique for flow control associated with a switched, half-duplex Ethernet using collision-based backpressure.

Since flow control using PAUSE frames is available only for Ethernet-based, full-duplex links, it is necessary for a switch port operating in a half-duplex mode to use other techniques. One flow control technique is referred to as collision-based backpressure. Herein, as shown by FIG. 7, if the policing function at the data link layer determines that the traffic contract has been exceeded, the switching device transmits a JAM packet or any other pattern packet to cause a collision on the Ethernet-based link (blocks 700, 710, 720 and 730). A "JAM packet" includes information that identifies itself as a packet for inducing collisions. Once the edge device detects a collision, the edge device stops transmission and waits a random period of time before retransmission (block 740). This period of time progressively increases for successive collisions. Hence, through successive JAM packets, the switching device is able to delay transmissions for a desired period of time (blocks 750, 760 and 770).

Referring now to FIG. 8, a second technique for flow control for switched, half-duplex Ethernet is referred to as "carrier sense backpressure". As shown, the policing function at the data link layer monitors whether the traffic contract is exceeded through use of a bit counter (blocks 800, 810 and 820). If the traffic contract is exceeded, the policing function signals for continuous transmission of preamble bits associated with a frame for the remainder of the total interval (TI) as shown in block 830. Since Switched Ethernet is based on CDMA/CD access protocol, the carrier sense signal is placed in a HIGH state (block 840). This allows the switching device to maintain ownership of the link and prevents the edge device from transmitting information and further exceeding the traffic contract. Normally, these preamble bits are output with a predetermined pattern (e.g., alternating "1"s and "0"s) defined by the physical link being used.

Once TI expires, the bit counter is reset and the carrier sense signal is placed in a LOW state (blocks 850 and 860). This enables the edge device to continue transmission of information to the switching device.

C. Policing for Resource ReSerVation Protocol (RSVP) Applications

Although not shown, Resource ReSerVation Protocol (RSVP) is an end-to-end signaling protocol that enables an edge device to reserve a guaranteed amount of bandwidth over a full-duplex link. RSVP operates at the network layer similar to a traffic contract for example. Thus, the negotiated bandwidth supported by the switching device may be translated to a policing function at the data link layer in a manner similar to the translation of the transmission rate for PAUSE frames.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for policing a flow of information into a switching device of a network, comprising:

ascertaining an accumulated count value for each packet of information received as input by the switching device during a predetermined interval;

determining by a policing function at a data link layer of the network whether the accumulated count value has exceeded an interval bit rate based on a transmission rate set by a traffic contract at a networking layer higher than the data link layer; and sending a PAUSE frame to halt transmission of the information when the accumulated count value has exceeded the interval bit rate.

2. The method of claim 1, wherein the accumulated count value is incremented for each bit of the information received by the switching device.

3. The method of claim 1, wherein the traffic contract resides in a network layer of the network.

4. The method of claim 1, wherein determining whether the accumulated count value has exceeded the interval bit rate comprises:

translating the transmission rate from the traffic contract to the policing function.

5. The method of claim 4 further comprising:

converting the transmission rate from the traffic contract into the interval bit rate; and determining whether the accumulated count value has exceeded the interval bit rate.

6. The method of claim 5, wherein the interval bit rate is based on slot times.

7. The method of claim 4 further comprising:
awaiting for transmission of additional packets of information when the accumulated count value is less than the interval bit rate.

8. The method of claim 1, wherein the sending of the PAUSE frame comprising:
accessing a pause timer value of the PAUSE frame to determine an amount of time to halt transmission of the input segments of information.

9. The method of claim 8 further comprising:
sending at least one additional PAUSE frame to halt transmission of the information when the accumulated count value has exceeded the interval bit rate.

10. The method of claim 8 further comprising:
refraining from sending an additional PAUSE frame to halt transmission of the packet of information if the PAUSE frame is associated with a last interval of the predetermined interval.

11. A method for policing a flow of information from an edge device into a switching device of a network through collision-based backpressure, comprising:
ascertaining an accumulated bit count for each bit of information received over a link of the network by the switching device during a predetermined interval;
determining by a policing function at a data link layer of the network whether the accumulated bit count has exceeded an interval bit rate based on a transmission rate set by a traffic contract at a networking layer higher than the data link layer; and
sending a JAM or other packet from the switching device to cause a collision on the link.

12. The method of claim 11 further comprising:
ceasing transmission over the link upon an edge device detecting the collision; and
waiting a random period of time by the edge device before retransmission of the information.

13. A method for policing a flow of information from an edge device into a switching device of a network through carrier sense backpressure, comprising:
determining by a policing function at a data link layer of the network whether an accumulated bit count has exceeded a predetermined bit rate over a selected interval, the interval bit rate based on a transmission rate set by a traffic contract at a networking layer higher than the data link layer; and
continuous transmission of bits associated with a preamble of a frame for a remainder of selected interval.

14. The method of claim 13 further comprising:
placing a carrier sense signal at a high state to allow the switching device to retain ownership of a link coupling the switching device to an edge device providing the information.

15. A medium having embodied thereon a program processed by a switching device of a network, comprising:
a count function implemented at a data link layer of the network, the count function to adjust an accumulated bit count for each bit of information received as input during a predetermined interval;
a traffic contract implemented at a network layer of the network, the traffic contract to set a transmission bit rate supported by the switching device; and
a policing function implemented at the data link layer of the network, the policing function to determine whether the accumulated bit count has exceeded the transmission bit rate and to prompt sending of a PAUSE frame to halt transmission of the input information.

16. The medium of claim 15, wherein the PAUSE frame including a pause timer value to determine an amount of time to halt transmission of the input information.

17. The medium of claim 16, wherein the policing function to send at least one additional PAUSE frame to halt transmission of the information if the PAUSE frame is incapable of halting transmission of the input information for a remainder of the predetermined interval.

18. To be implemented within a network, a switching device comprising:
processing logic;
a plurality of addressable ports to receive incoming information and to route the incoming information to the processing logic; and
a memory to contain a policing function associated with a data link layer of the network, the policing function to receive a negotiated transmission bit rate from a traffic contract associated with a layer of the network higher than the data link layer and to determine whether an accumulated bit count of the incoming information has exceeded an interval bit rate based on the negotiated transmission bit rate over a predetermined interval.

19. The switching device of claim 18, wherein the processing logic includes a controller.

20. The switching device of claim 18, wherein the processing logic to send a PAUSE frame to halt transmission of the information when the accumulated bit count has exceeded the interval bit rate.

21. The switching device of claim 18, wherein the processing logic to send a JAM packet from the switching device to cause a collision on the link.

22. The switching device of claim 18, wherein the processing logic to send a continuous transmission of bits associated with a preamble of a frame for a remainder of the predetermined interval.

* * * * *